United States Patent
Ou

(10) Patent No.: US 8,724,316 B2
(45) Date of Patent: May 13, 2014

(54) HANDHELD ELECTRONIC DEVICE

(75) Inventor: Tsung-Yuan Ou, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 356 days.

(21) Appl. No.: 13/304,392

(22) Filed: Nov. 24, 2011

(65) Prior Publication Data
US 2013/0135793 A1 May 30, 2013

(51) Int. Cl.
*H05K 7/00* (2006.01)

(52) U.S. Cl.
USPC ............ 361/679.56; 361/679.55; 361/679.27; 361/679.09; 361/679.3; 345/168; 345/169

(58) Field of Classification Search
USPC ............. 361/679.56, 679.55, 679.27, 679.09, 361/679.3; 345/168, 169
See application file for complete search history.

(56) References Cited

U.S. PATENT DOCUMENTS

| | | | |
|---|---|---|---|
| 6,850,226 B2 * | 2/2005 | Finke-Anlauff | 345/169 |
| 7,627,337 B2 | 12/2009 | Maatta et al. | |
| 8,306,586 B2 * | 11/2012 | Ou et al. | 455/575.4 |

* cited by examiner

*Primary Examiner* — Robert J Hoffberg
*Assistant Examiner* — Hung Dang
(74) *Attorney, Agent, or Firm* — Jianq Chyun IP Office

(57) ABSTRACT

A handheld electronic device includes a first body, a pivot member, a second body and a third body. The pivot member is pivoted to the first body. The second body is slidably disposed on the pivot member. The third body is pivoted to the first body and stacked between the first body and the second body, such that the handheld electronic device is in a stacked state. When the second body slides along the pivot member to expose the third body, the pivot member is pivotally rotated relative to the first body automatically to drive the second body to tilt, the third body is pivotally rotated relative to the first body automatically to tilt, and a top surface of the second body and a top surface of the third body together form a continuous surface, such that the handheld electronic device is in an expanded state.

12 Claims, 16 Drawing Sheets

HANDHELD ELECTRONIC DEVICE

BACKGROUND OF THE INVENTION

1. Field of the Invention

The application relates to an electronic device. Particularly, the application relates to a handheld electronic device.

2. Description of Related Art

Along with development of information technology, it is easier to obtain required information from electronic devices in daily life. On the other hand, with improvement of industrial engineering, various electronic devices have a general trend of lightness, slimness, shortness and smallness, and since the electronic devices have a feature and advantage of portability, they are widely used in people's daily life.

Taking mobile phones as an example, to meet a requirement of portability and different preferences and demands, besides a conventional bar-type mobile phone, the mobile phones further include clamshell mobile phones, swivel mobile phones, and sliding mobile phones, etc. Taking the sliding mobile phone as an example, an upper body thereof is stacked over and can be slid relative to a lower body thereof, so as to present different operation modes of open and close. Stacking of the two bodies avails reducing a whole size of the mobile phone, and the two bodies can be spread during a specific operation mode.

Taking a two-layer sliding phone having a keyboard as an example, an operation method thereof is as follows. A display screen of the slide phone can be slid to one side of the keyboard to expose the keyboard, so as to facilitate a user to perform an input operation. However, in case of such design, after the display screen is slid relative to the keyboard, a height difference is formed there between to present a step profile, so that an appearance of the slide phone is lack of integrity. Moreover, if the display screen has a touch control function, it is inconvenience in operation due to the height difference of the screen and the keyboard.

SUMMARY OF THE INVENTION

The application is directed to a handheld electronic device, which has an integral appearance and is convenient in operation, and can simplify a manual process in body motion of the device.

The application provides a handheld electronic device including a first body, a pivot member, a second body and a third body. The pivot member is pivoted to the first body. The second body is slidably disposed on the pivot member. The third body is pivoted to the first body and is stacked between the first body and the second body, such that the handheld electronic device is in a stacked state. When the second body slides along the pivot member to expose the third body, the pivot member is pivotally rotated relative to the first body automatically to drive the second body to tilt, the third body is pivotally rotated relative to the first body automatically to tilt, and a top surface of the second body and a top surface of the third body commonly form a continuous surface, such that the handheld electronic device is in an expanded state.

According to the above descriptions, when the user slides the second body to expose the third body, the second body and the third body are pivotally rotated and tilted automatically, such that the top surface of the second body and the top surface of the third body commonly form the continuous surface. In this way, the handheld electronic device has an integral appearance in the expanded state, and the continuous surface provides the user a comfortable input interface, so as to increase the input speed. Moreover, since the second body and the third body are pivotally rotated automatically by only sliding the second body, the manual process for body motion is simplified, which avails the user quickly changing the handheld electronic device from the stacked state to the expanded state.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

18 along a G-G line.

Figure 25:
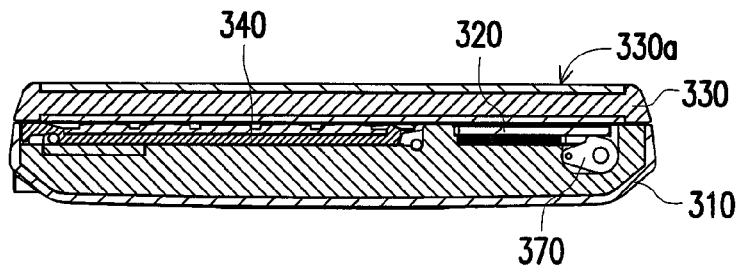
FIG. 25 is a cross-sectional view of the handheld electronic device of FIG.
Figure 26A:
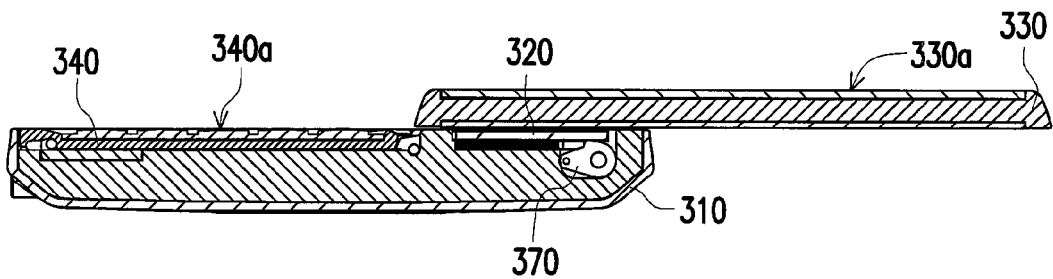
Figure 26B:
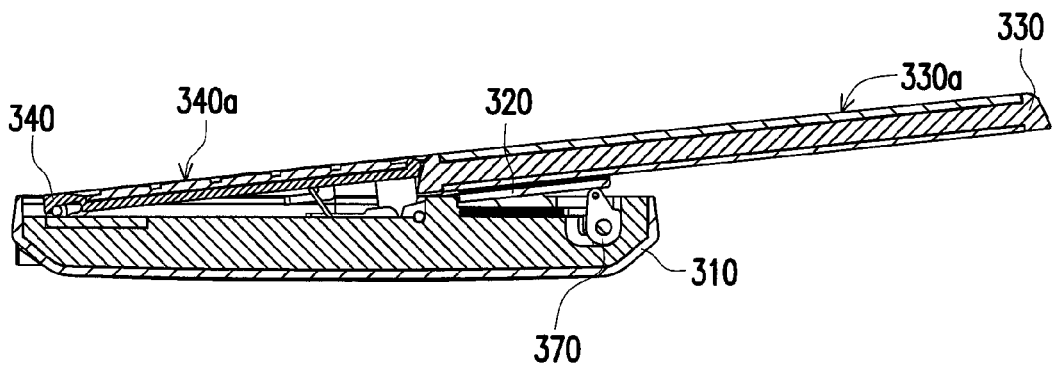

FIG. 26A and FIG. 26B illustrate a motion flow of the handheld electronic device of FIG. 25.

DETAILED DESCRIPTION OF DISCLOSED EMBODIMENTS

Figure 1:
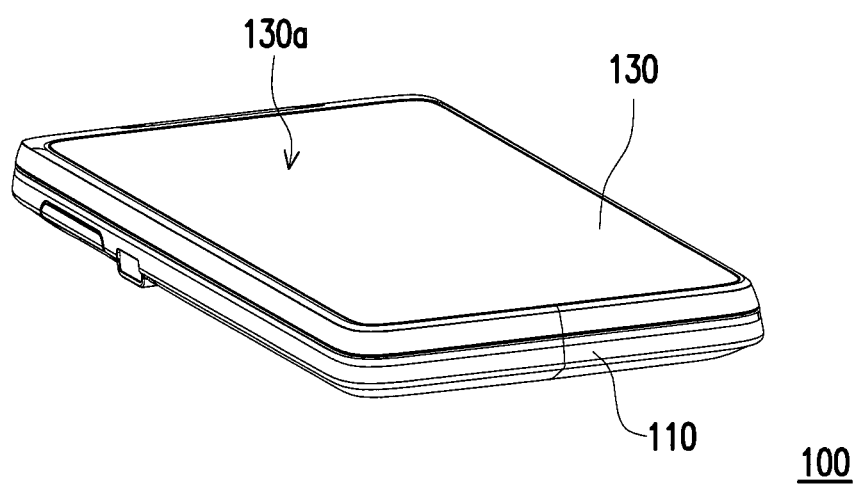
FIG. 1 is a three-dimensional view of a handheld electronic device in a stacked state according to an embodiment of the invention.
Figure 2:
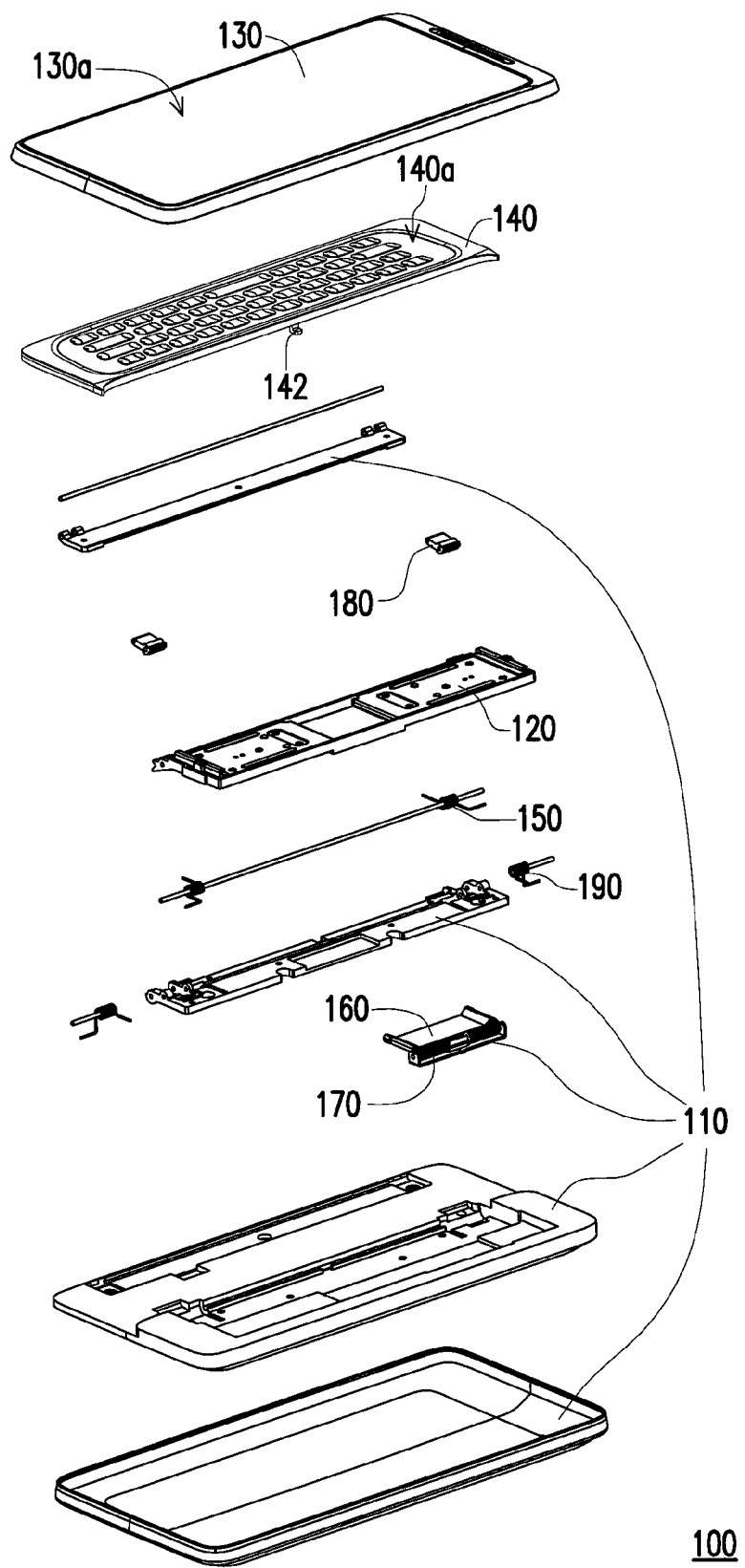
FIG. 2 is an exploded view of the handheld electronic device of FIG. 1.
Figure 3:
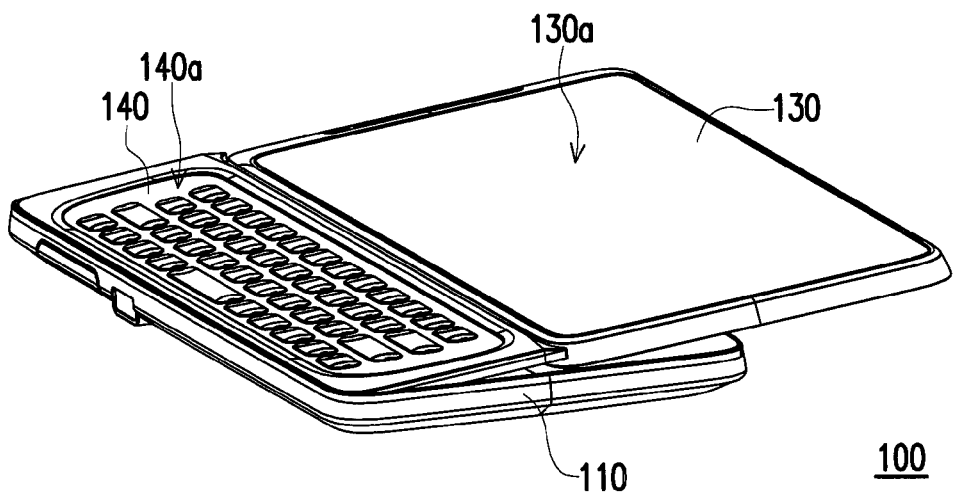
FIG. 3 is a three-dimensional view of the handheld electronic device of FIG. 1 in an expanded state.

FIG. 1 is a three-dimensional view of a handheld electronic device in a stacked state according to an embodiment of the invention. FIG. 2 is an exploded view of the handheld electronic device of FIG. 1. FIG. 3 is a three-dimensional view of the handheld electronic device of FIG. 1 in an expanded state. Referring to FIG. 1 to FIG. 3, the handheld electronic device 100 of the present embodiment includes a first body 110, a pivot member 120, a second body 130 and a third body 140. The pivot member 120 is pivoted to the first body 110. The second body 130 is slidably disposed on the pivot member 120. The third body 140 is pivoted to the first body 110 and is stacked between the first body 110 and the second body 130, such that the handheld electronic device is in the stacked state.

Figure 4:
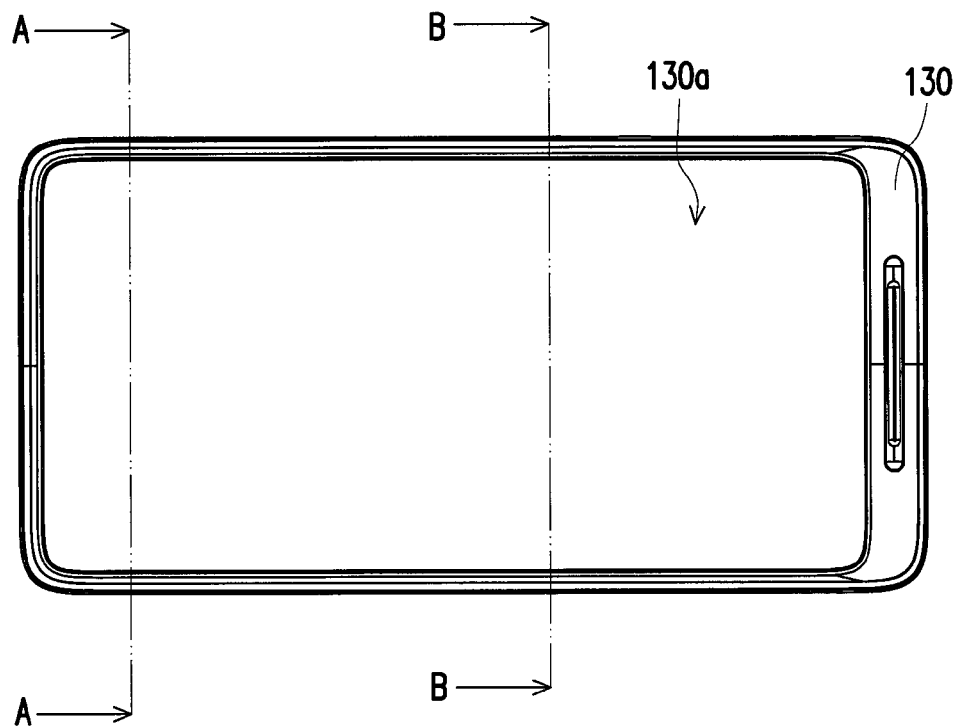
FIG. 4 is a top view of the handheld electronic device of FIG. 1.
Figure 5:
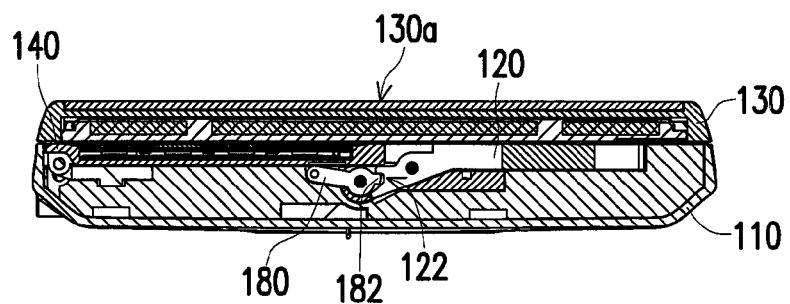
FIG. 5 is a cross-sectional view of the handheld electronic device of FIG. 4 along an A-A line.
Figure 6A:
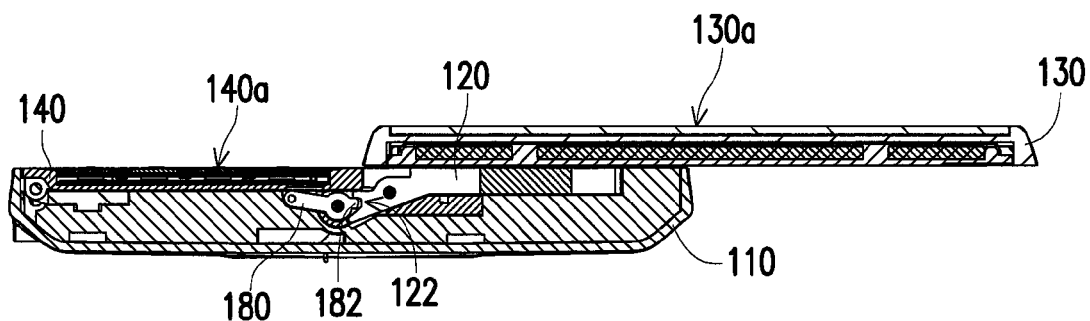
FIG. 6A and FIG. 6B illustrate a motion flow of the handheld electronic device of FIG. 5.
Figure 6B:
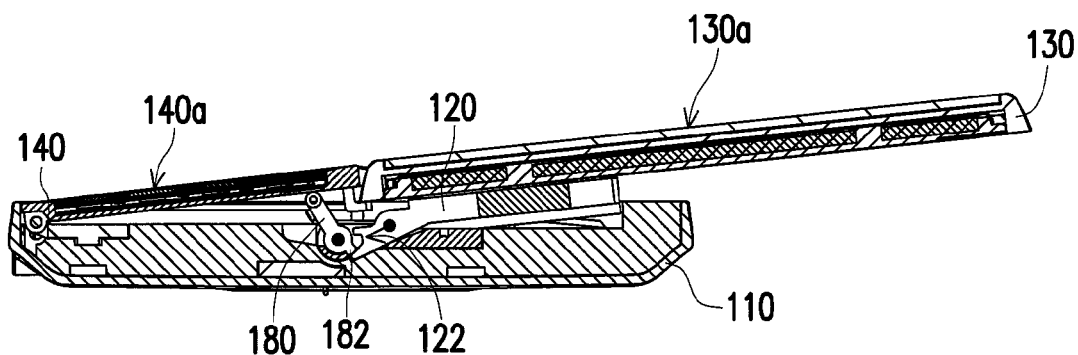

FIG. 4 is a top view of the handheld electronic device of FIG. 1. FIG. 5 is a cross-sectional view of the handheld electronic device of FIG. 4 along an A-A line. FIG. 6A and FIG. 6B illustrate a motion flow of the handheld electronic device of FIG. 5. When the second body 130 of FIG. 5 slides along the pivot member 120 to expose the third body 140 as that shown in FIG. 6A, the pivot member 120 is pivotally rotated relative to the first body 110 automatically to drive the second body 130 to tilt as that shown in FIG. 6B, the third body 140 is pivotally rotated relative to the first body 110 automatically to tilt, and a top surface 130a of the second body 130 and a top surface 140a of the third body 140 commonly form a continuous surface, such that the handheld electronic device 100 is in the expanded state.

According to the above configuration, the handheld electronic device 100 may have an integral appearance under the expanded state, and the continuous surface provides the user a comfortable input interface, so as to increase the input speed. Moreover, since the second body 130 and the third body 140 are pivotally rotated automatically by only sliding the second body 130, the manual process for body motion is simplified, which avails the user quickly changing the handheld electronic device 100 from the stacked state to the expanded state.

In the present embodiment, the top surface 130a of the second body 130 is, for example, a touch display surface, and the top surface 140a of the third body 140 is, for example, a keyboard module. However, in other embodiments, the top surface 140a of the third body 140 can also be the touch display surface. When the handheld electronic device 100 is in the expanded state as that shown in FIG. 3, the touch display surface and the keyboard module form a continuous surface, such that the user can conveniently perform the input operation through the touch display surface and the keyboard module.

Detailed components and an operation principle of the handheld electronic device 100 are introduced below with reference of figures.

Referring to FIG. 2, the handheld electronic device 100 of the present embodiment includes at least one elastic component 150 (two elastic components are illustrated), and each of the elastic components 150 is, for example, a torsion spring and is connected between the first body 110 and the pivot member 120. When the handheld electronic device 100 is in the stacked state as that shown in FIG. 1 and FIG. 5, a structural interference between the second body 130 and the third body 140 forces the elastic components 150 to store elastic potential energy. When the third body 140 is exposed by the second body 130 as that shown in FIG. 6A, the structural interference between the second body 130 and the third body 140 is released and the elastic components 150 release the elastic potential energy, and the pivot member 120 is pivotally rotated relative to the first body 110 to a state as that shown in FIG. 6B through an elastic force of each of the elastic components 150.

Referring to FIG. 2 and FIG. 5, the handheld electronic device 100 of the present embodiment includes at least one rod 180 (two rods are illustrated in FIG. 2) and at least one elastic component 190 (two elastic components are illustrated in FIG. 2). Two ends of each rod 180 are respectively pivoted to the first body 110 and the third body 140. Each of the elastic components 190 is, for example, a torsion spring and is connected between the first body 110 and the rod 180. When the handheld electronic device 100 is in the stacked state as that shown in FIG. 1 and FIG. 5, the structural interference between the second body 130 and the third body 140 forces the elastic components 190 to store elastic potential energy. When the third body 140 is exposed by the second body 130 as that shown in FIG. 6A, the structural interference between the second body 130 and the third body 140 is released, and the elastic components 190 release the elastic potential energy, and each of the rods 180 is pivotally rotated relative to the first body 110 to a state as that shown in FIG. 6B through an elastic force of the corresponding elastic component 190, so as to drive the third body 140 to pivotally rotate relative to the first body 110.

Referring to FIG. 5, in the present embodiment, each of the rods 180 has a convex portion 182, the pivot member 120 has a concave portion 122, and the convex portion 182 is inserted into the concave portion 122. When each of the rods 180 is pivotally rotated relative to the first body 110 from the state shown in FIG. 6A to the state shown in FIG. 6B through the elastic force of the corresponding elastic component 190, the convex portion 182 pushes the pivot member 120 to pivotally rotate relative to the first body 110. In other words, besides driving the third body 140 to pivotally rotate, each of the rods 180 can further push the pivot member 120 to pivotally rotate, so as to ensure a smooth operation of the whole structure. Moreover, in the present embodiment, the third body 140 has a hook 142. When the handheld electronic device 100 is in the expanded state as that shown in FIG. 6B, the hook 142 leans against the second body 130 to limit a tilting angle of the third body 140, such that the top surface 140a of the third body 140 and the top surface 130a of the second body 130 can smoothly form the continuous surface.

Figure 7:
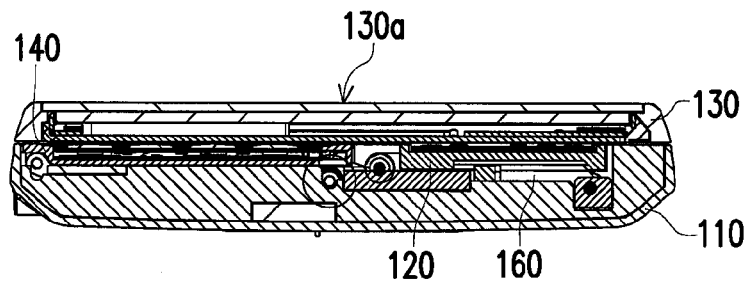
FIG. 7 is a cross-sectional view of the handheld electronic device of FIG. 4 along a B-B line.
Figure 8A:
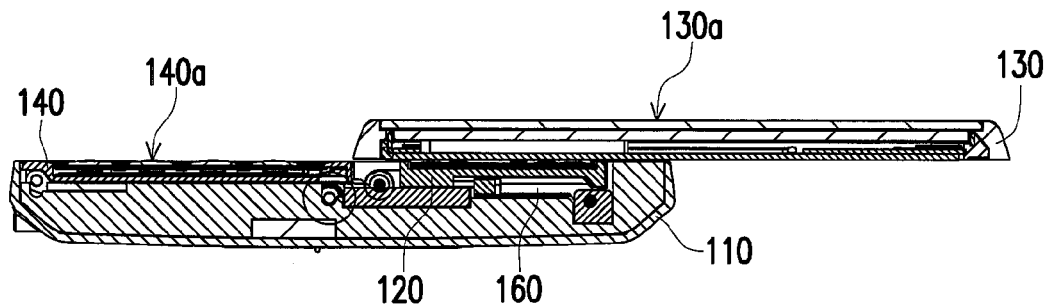
FIG. 8A and FIG. 8B illustrate a motion flow of the handheld electronic device of FIG. 7.
Figure 8B:
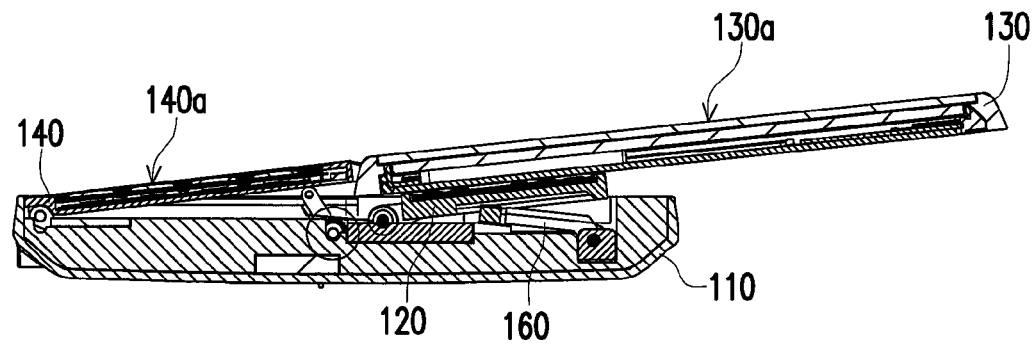

FIG. 7 is a cross-sectional view of the handheld electronic device of FIG. 4 along a B-B line. FIG. 8A and FIG. 8B illustrate a motion flow of the handheld electronic device of FIG. 7. Referring to FIG. 2 and FIG. 7, the handheld electronic device 100 of the present embodiment includes a push component 160 and an elastic component 170. The push component 160 is pivoted to the first body 110. The elastic component 170 is, for example, a torsion spring and is connected between the first body 110 and the push component 160. When the handheld electronic device 100 is in the stacked state as that shown in FIG. 1 and FIG. 7, the structural interference between the second body 130 and the third body 140 forces the elastic component 170 to store elastic potential energy. When the third body 140 is exposed by the second body 130 as that shown in FIG. 8A, the structural interference between the second body 130 and the third body 140 is released and the elastic component 170 releases the elastic potential energy, and the push component 160 is pivotally rotated relative to the first body 110 through an elastic force of the elastic component 170, so as to push the pivot member 120 to pivotally rotate relative to the first body 110 to a state as that shown in FIG. 8B.

Figure 9:
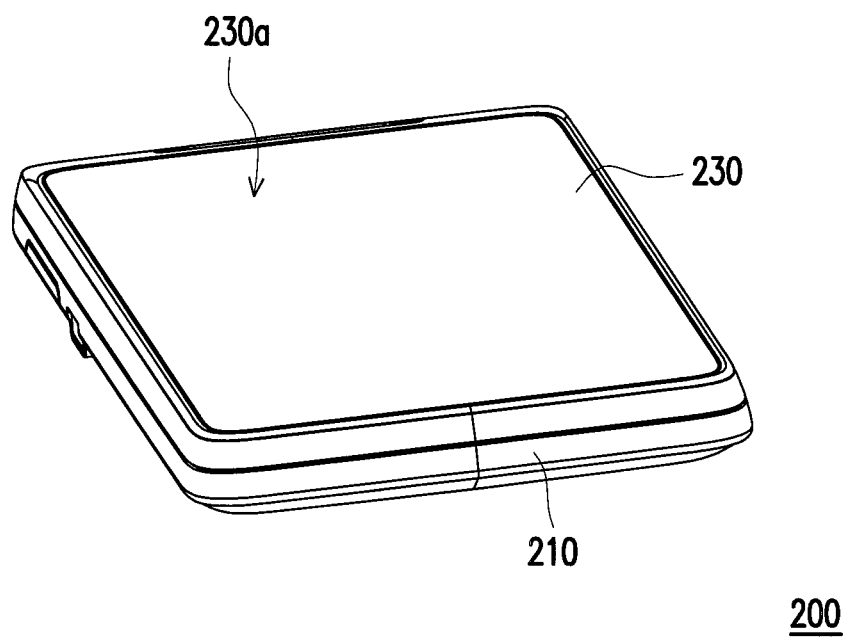
FIG. 9 is a three-dimensional view of a handheld electronic device in a stacked state according to another embodiment of the invention.
Figure 10:
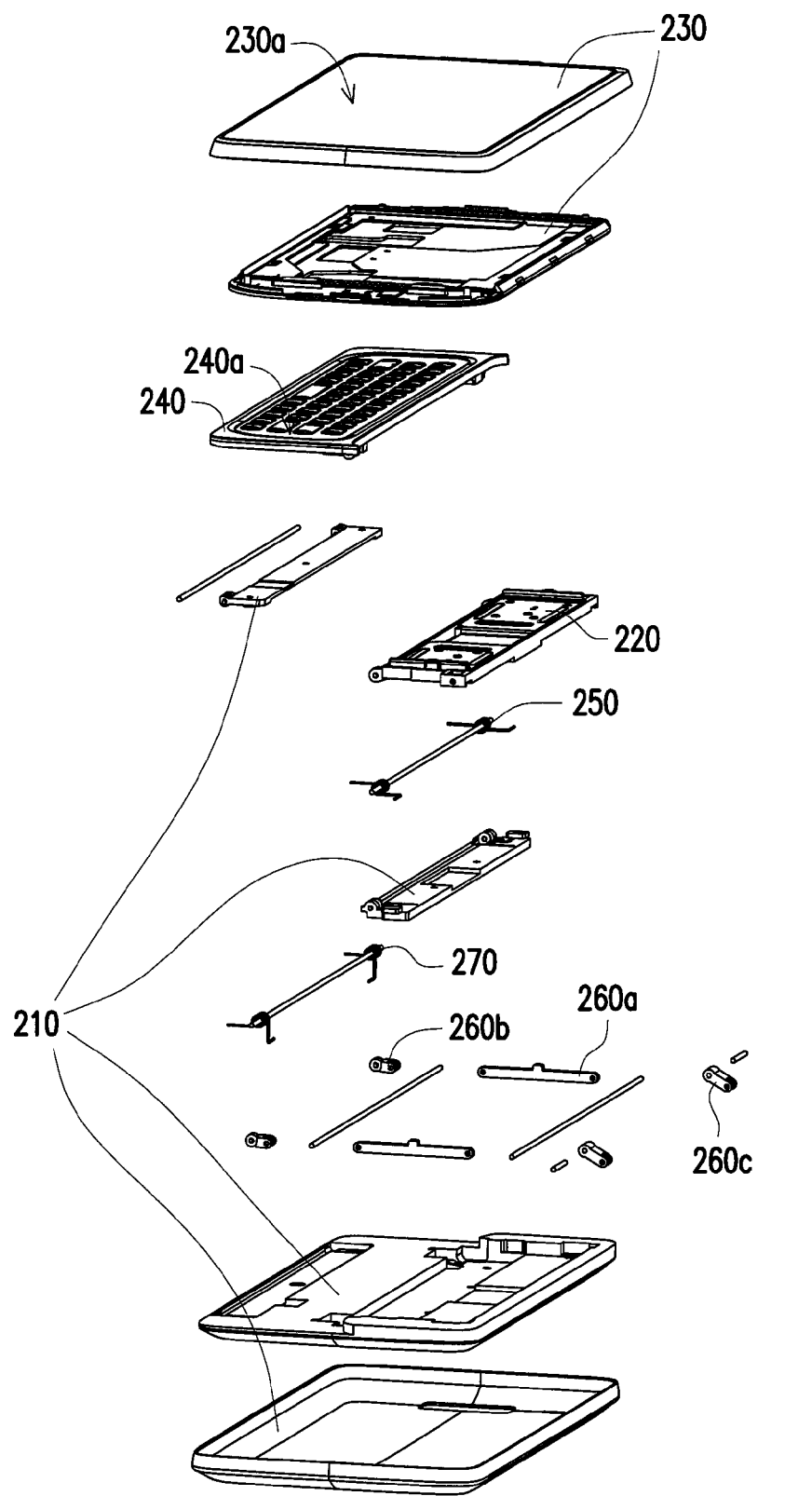
FIG. 10 is an exploded view of the handheld electronic device of FIG. 9.
Figure 11:
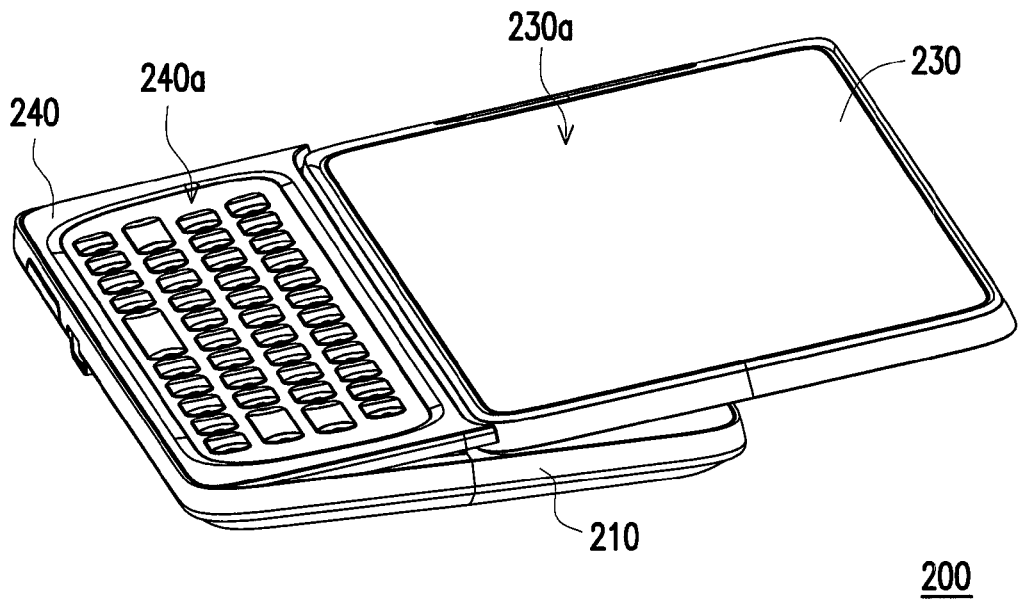
FIG. 11 is a three-dimensional view of the handheld electronic device of FIG. 9 in an expanded state.

FIG. 9 is a three-dimensional view of a handheld electronic device in the stacked state according to another embodiment of the invention. FIG. 10 is an exploded view of the handheld electronic device of FIG. 9. FIG. 11 is a three-dimensional view of the handheld electronic device of FIG. 9 in the expanded state. Referring to FIG. 9 to FIG. 11, the handheld electronic device 200 of the present embodiment includes a first body 210, a pivot member 220, a second body 230 and a third body 240. The pivot member 220 is pivoted to the first body 210. The second body 230 is slidably disposed on the pivot member 220. The third body 240 is pivoted to the first body 210 and is stacked between the first body 210 and the second body 230, such that the handheld electronic device 200 is in the stacked state.

Figure 12:
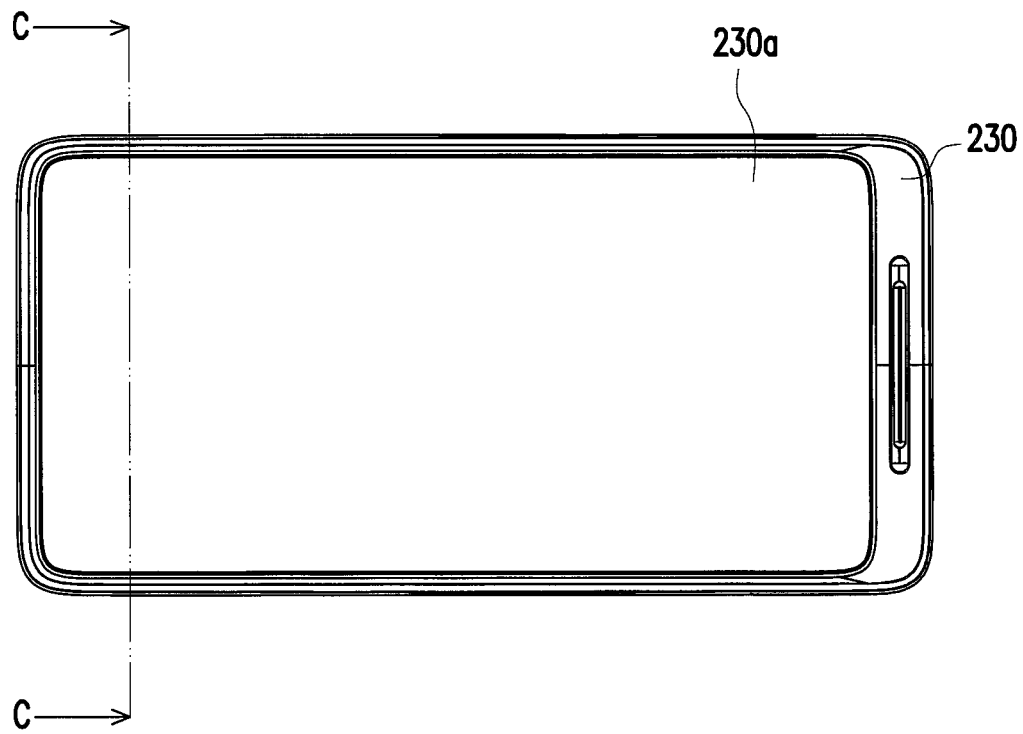
FIG. 12 is a top view of the handheld electronic device of FIG. 9.
Figure 13:
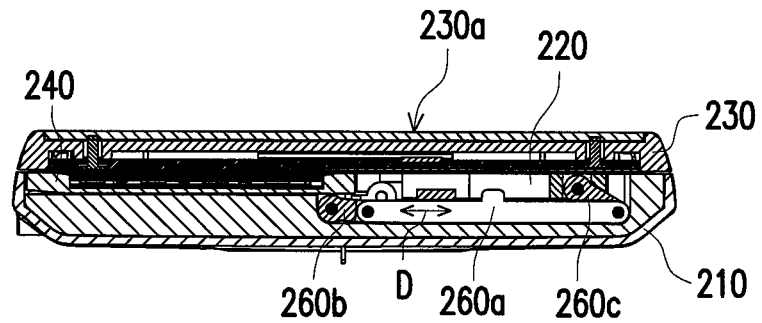
FIG. 13 is a cross-sectional view of the handheld electronic device of FIG. 12 along a C-C line.
Figure 14A:
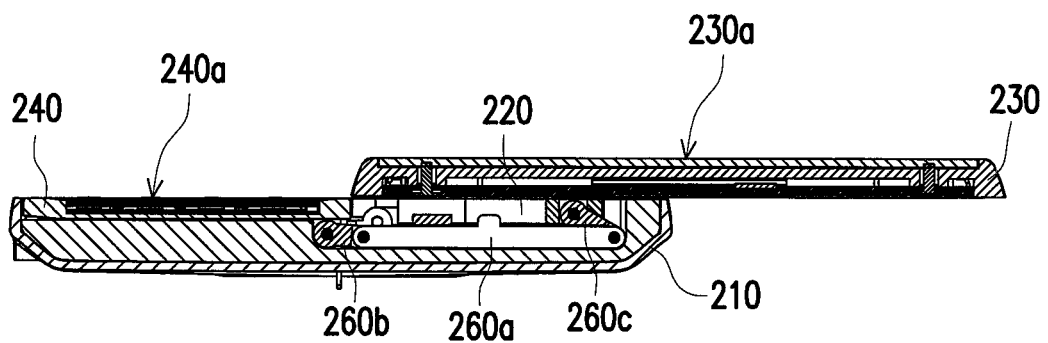
FIG. 14A and FIG. 14B illustrate a motion flow of the handheld electronic device of FIG. 13.
Figure 14B:
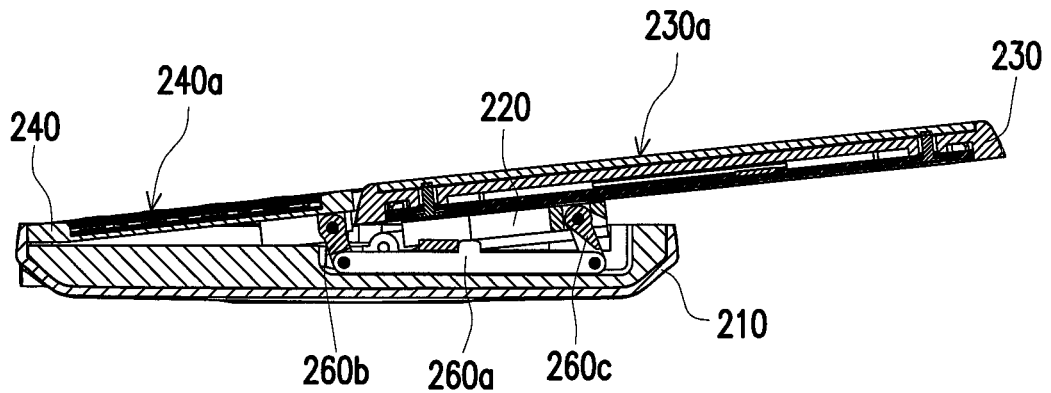

FIG. 12 is a top view of the handheld electronic device of FIG. 9. FIG. 13 is a cross-sectional view of the handheld electronic device of FIG. 12 along a C-C line. FIG. 14A and FIG. 14B illustrate a motion flow of the handheld electronic device of FIG. 13. When the second body 230 of FIG. 13 slides along the pivot member 220 to expose the third body 240 as that shown in FIG. 14A, the pivot member 220 is pivotally rotated relative to the first body 210 automatically to drive the second body 230 to tilt as that shown in FIG. 14B, the third body 240 is pivotally rotated relative to the first body 210 automatically to tilt, and a top surface 230a of the second body 230 and a top surface 240a of the third body 240 commonly form a continuous surface, such that the handheld electronic device 200 is in the expanded state as that shown in FIG. 11.

According to the above configuration, the handheld electronic device 200 may have an integral appearance under the expanded state, and the continuous surface provides the user a comfortable input interface, so as to increase the input speed. Moreover, since the second body 230 and the third body 240 are pivotally rotated automatically by only sliding the second body 230, the manual process for body motion is simplified, which avails the user quickly changing the handheld electronic device 200 from the stacked state to the expanded state.

In the present embodiment, the top surface 230a of the second body 230 is, for example, a touch display surface, and the top surface 240a of the third body 240 is, for example, a keyboard module. However, in other embodiments, the top surface 240a of the third body 240 can also be the touch display surface. When the handheld electronic device 200 is in the expanded state as that shown in FIG. 11, the touch display surface and the keyboard module form a continuous surface, such that the user can conveniently perform the input operation through the touch display surface and the keyboard module.

Detailed components and an operation principle of the handheld electronic device 200 are introduced below with reference of figures.

Referring to FIG. 10, the handheld electronic device 200 of the present embodiment includes at least one elastic component 250 (two elastic components are illustrated), and each of the elastic components 250 is, for example, a torsion spring and is connected between the first body 210 and the pivot member 220. When the handheld electronic device 200 is in the stacked state as that shown in FIG. 9 and FIG. 13, a structural interference between the second body 230 and the third body 240 forces the elastic components 250 to store elastic potential energy. When the third body 240 is exposed by the second body 230 as that shown in FIG. 14A, the structural interference between the second body 230 and the third body 240 is released and the elastic components 250 release the elastic potential energy, and the pivot member 220 is pivotally rotated relative to the first body 210 to a state as that shown in FIG. 14B through an elastic force of each of the elastic components 250.

Referring to FIG. 10 and FIG. 13, the handheld electronic device 200 of the present embodiment includes at least one first rod 260a (two first rods are illustrated in FIG. 10), at least one second rod 260b (two second rods are illustrated in FIG. 10), at least one third rod 260c (two third rods are illustrated in FIG. 10) and at least one elastic component 270 (two elastic components are illustrated in FIG. 10). Each of the first rods 260a is slidably disposed on the first body 210 along a direction D. Two ends of each second rod 260b are respectively pivoted to the corresponding first rod 260a and the third body 240. Two ends of each third rod 260c are respectively pivoted to the corresponding first rod 260a and the pivot member 220. Each of the elastic components 270 is, for example, a torsion spring and is connected between the third body 240 and the corresponding second rod 260b. When the handheld electronic device 200 is in the stacked state as that shown in FIG. 9 and FIG. 13, the structural interference between the second body 230 and the third body 240 forces the elastic components 270 to store elastic potential energy. When the third body 240 is exposed by the second body 230 as that shown in FIG. 14A, the structural interference between the second body 230 and the third body 240 is released, and the elastic components 270 release the elastic potential energy, and the first rods 260a, the second rods 260b and the third rods 260c move in linkage through the elastic force of the elastic components 270, so as to drive the third body 240 and the pivot member 220 to pivotally rotate relative to the first body 210 to the state shown in FIG. 14B.

When the user wants to recover the handheld electronic device 200 to the stacked state, the user exerts a force on the second body 230 shown in FIG. 14B to resist the elastic force of each of the elastic components 270 to drive the pivot member 220, the first rods 260a, the second rods 260b, the third rods 260c and the third body 240 to move in linkage, such that the second body 230 and the third body 240 are parallel to the first body 210 as that shown in FIG. 14A. Then, the user can recover the handheld electronic device 200 to the stacked state by only sliding the second body 230 of FIG. 14A to a position as that shown in FIG. 13.

Figure 15:
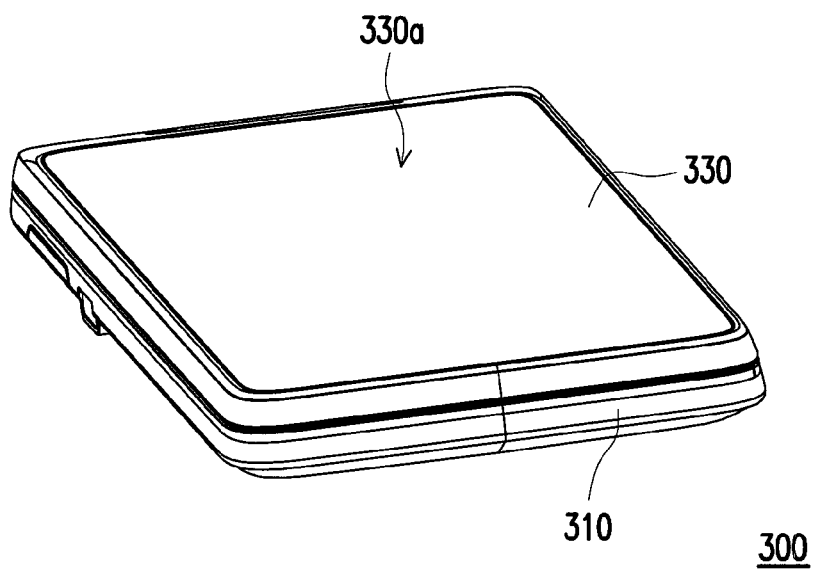
FIG. 15 is a three-dimensional view of a handheld electronic device in a stacked state according to another embodiment of the invention.
Figure 16:
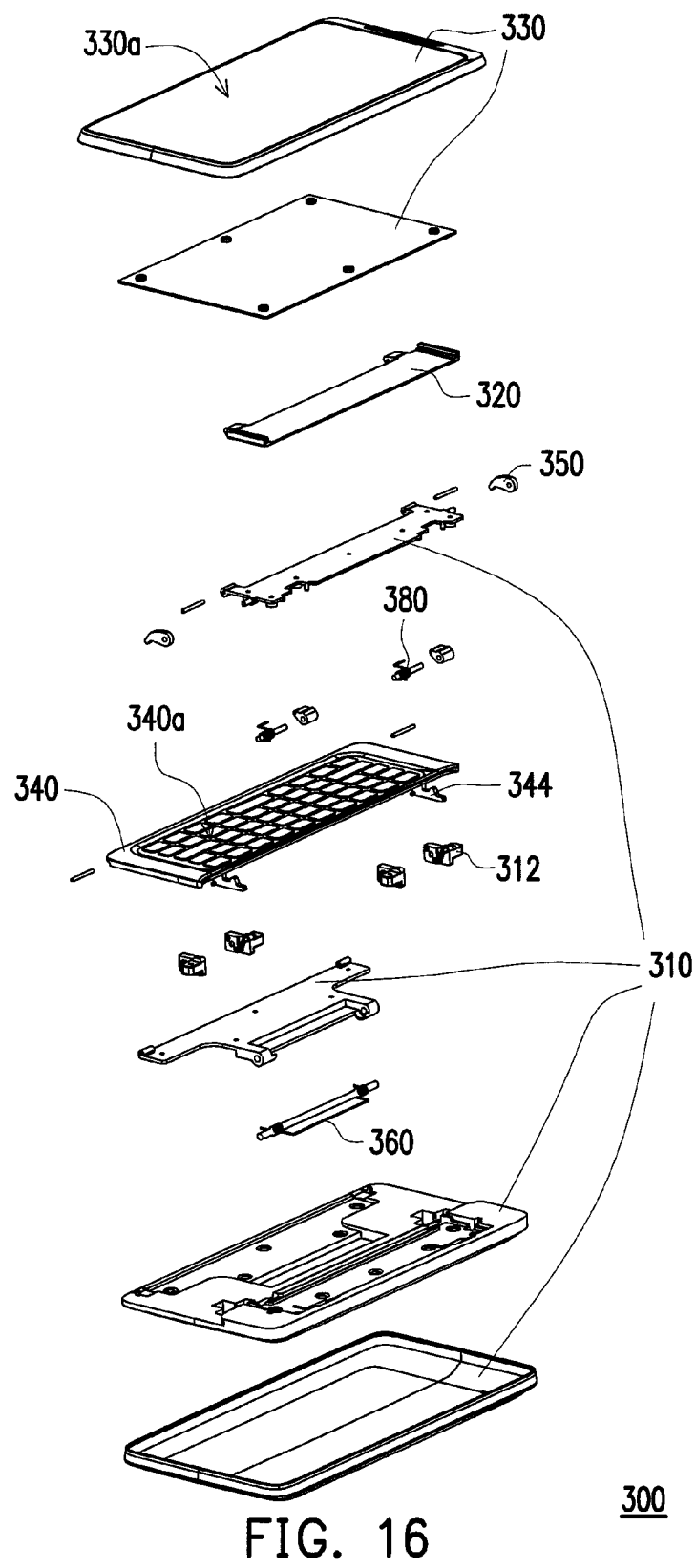
FIG. 16 is an exploded view of the handheld electronic device of FIG. 15.
Figure 17:
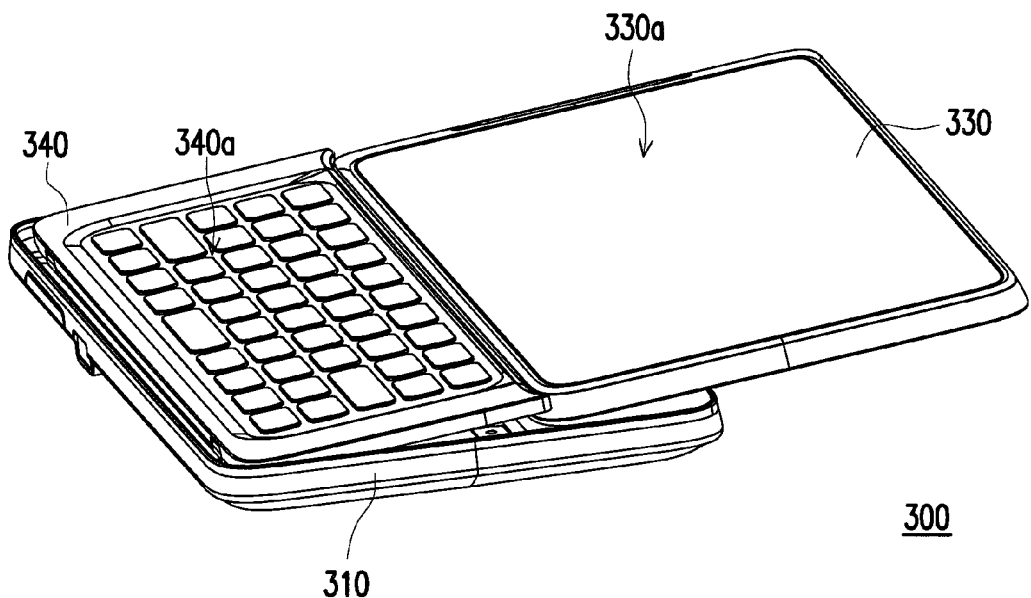
FIG. 17 is a three-dimensional view of the handheld electronic device of FIG. 15 in an expanded state.

FIG. 15 is a three-dimensional view of a handheld electronic device in the stacked state according to another embodiment of the invention. FIG. 16 is an exploded view of the handheld electronic device of FIG. 15. FIG. 17 is a three-dimensional view of the handheld electronic device of FIG. 15 in the expanded state. Referring to FIG. 15 to FIG. 17, the handheld electronic device 300 of the present embodiment includes a first body 310, a pivot member 320, a second body 330 and a third body 340. The pivot member 320 is pivoted to the first body 310. The second body 330 is slidably disposed on the pivot member 320. The third body 340 is pivoted to the first body 310 and is stacked between the first body 310 and the second body 330, such that the handheld electronic device 300 is in the stacked state.

Figure 18:
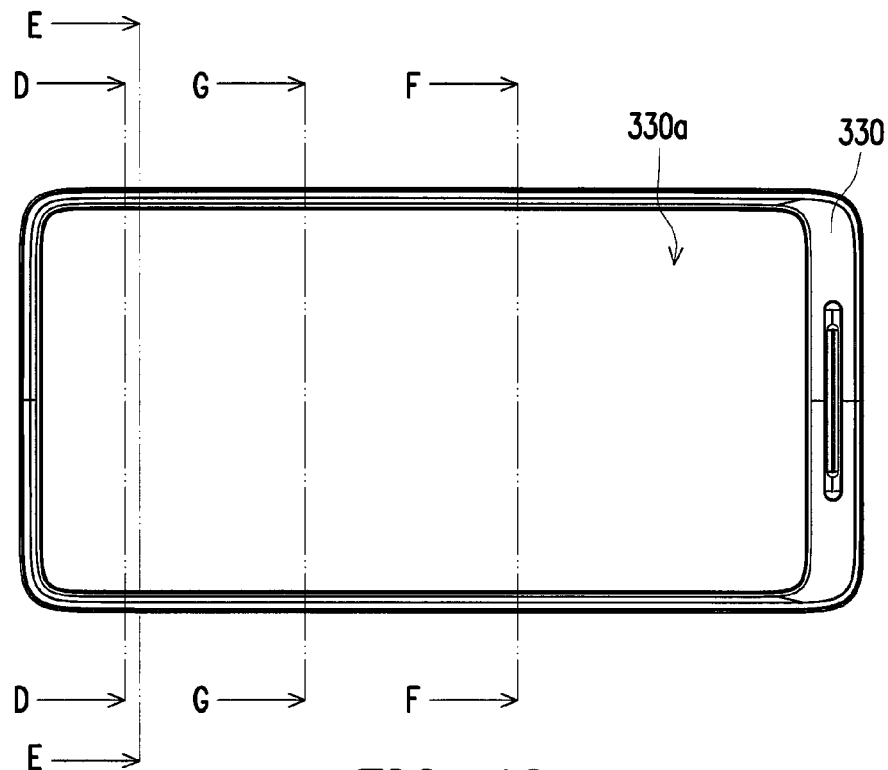
FIG. 18 is a top view of the handheld electronic device of FIG. 15.
Figure 19:
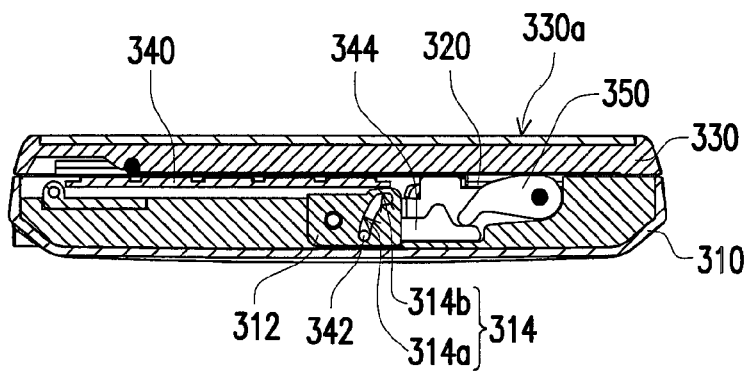
FIG. 19 is a cross-sectional view of the handheld electronic device of FIG. 18 along a D-D line.
Figure 20A:
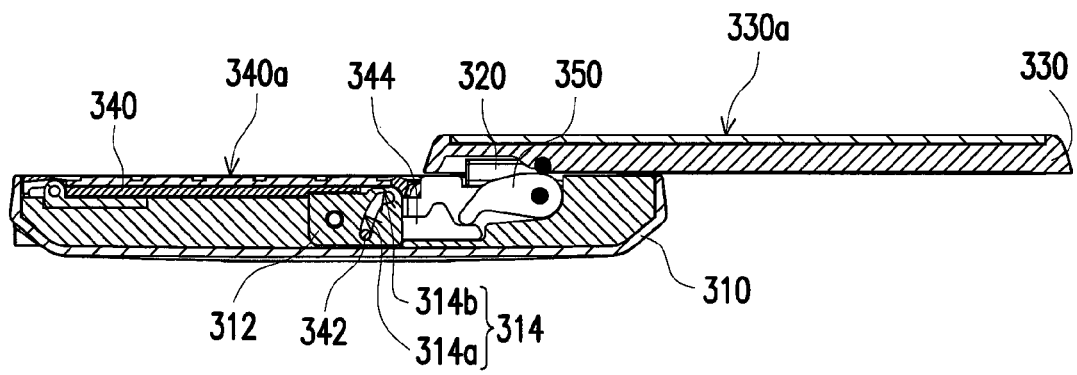
FIG. 20A and FIG. 20B illustrate a motion flow of the handheld electronic device of FIG. 19.
Figure 20B:
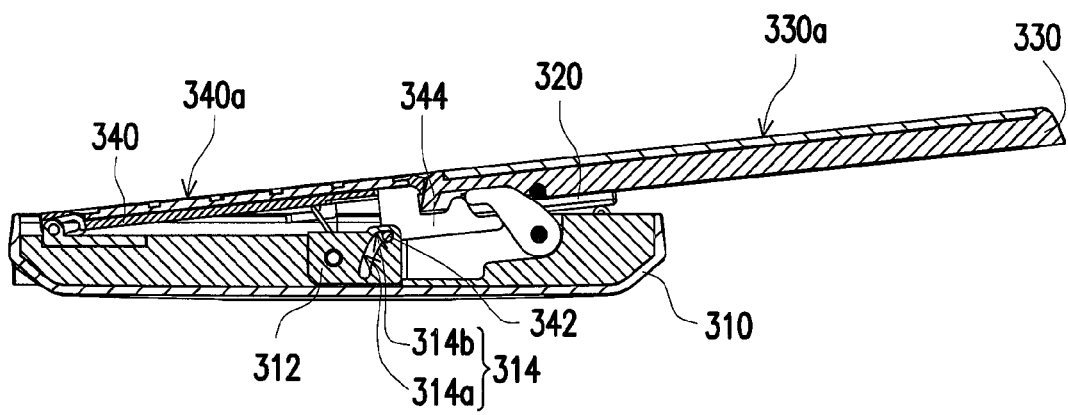

FIG. 18 is a top view of the handheld electronic device of FIG. 15. FIG. 19 is a cross-sectional view of the handheld electronic device of FIG. 18 along a D-D line. FIG. 20A and FIG. 20B illustrate a motion flow of the handheld electronic device of FIG. 19. When the second body 330 of FIG. 18 slides along the pivot member 320 to expose the third body 340 as that shown in FIG. 20A, the pivot member 320 is pivotally rotated relative to the first body 310 automatically to drive the second body 330 to tilt as that shown in FIG. 20B, the third body 340 is pivotally rotated relative to the first body 310 automatically to tilt, and a top surface 330a of the second body 330 and a top surface 340a of the third body 340 commonly form a continuous surface, such that the handheld electronic device 300 is in the expanded state as that shown in FIG. 17.

According to the above configuration, the handheld electronic device 300 may have an integral appearance under the expanded state, and the continuous surface provides the user a comfortable input interface, so as to increase the input speed. Moreover, since the second body 330 and the third body 340 are pivotally rotated automatically by only sliding the second body 330, the manual process for body motion is simplified, which avails the user quickly changing the handheld electronic device 300 from the stacked state to the expanded state.

In the present embodiment, the top surface 330a of the second body 330 is, for example, a touch display surface, and the top surface 340a of the third body 340 is, for example, a keyboard module. However, in other embodiments, the top surface 340a of the third body 340 can also be the touch display surface. When the handheld electronic device 300 is in the expanded state as that shown in FIG. 17, the touch display surface and the keyboard module form a continuous surface, such that the user can conveniently perform the input operation through the touch display surface and the keyboard module.

Detailed components and an operation principle of the handheld electronic device 300 are introduced below with reference of figures.

Referring to FIG. 16 and FIG. 19, in the present embodiment, the first body 310 has at least one assembling component 312 (a plurality of assembly components is illustrated in FIG. 19). Each of the assembling components 312 has a sliding slot 314, and the sliding slot 314 includes a first section 314a and a second section 314b. The third body 340 has at least one convex pillar 342, and the convex pillar 342 is slidably disposed in the sliding slot 314 and is suitable for sliding along the sliding slot 314 as the third body 340 is pivotally rotated relative to the first body 310. When the handheld electronic device 300 is changed from the stacked state shown in FIG. 19 to the expanded state shown in FIG. 20B, the convex pillar 342 is slid from the first section 314a to the second section 314b. When the handheld electronic device 300 is in the expanded state, an extending direction of the first section 314a is tilted to the top surface 340a of the third body 340, and an extending direction of the second section 314b is parallel to the top surface 340a of the third body 340. In this way, when the user presses the top surface 340a of the third body 340 of FIG. 20B to perform a touch input, the convex pillar 342 is pushed along a direction perpendicular to the second section 314b, such that the convex pillar 340 does not slide along the second section 314b, so as to avoid swaying the third body 340 due to the touch input of the user. In other embodiments, the assembling components 312 can also be integrally formed on the first body 310, which is not limited by the application.

Figure 21:
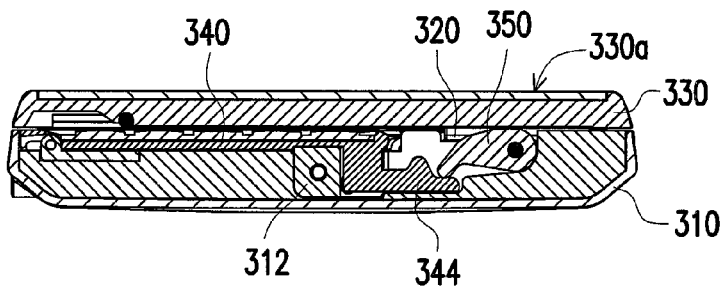
FIG. 21 is a cross-sectional view of the handheld electronic device of FIG. 18 along an E-E line.
Figure 22A:
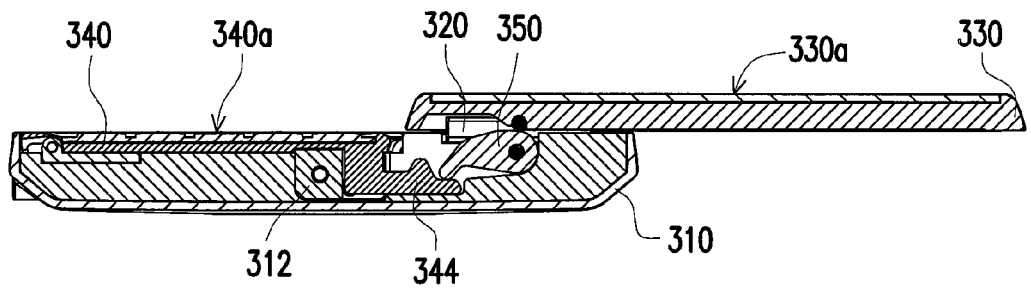
FIG. 22A and FIG. 22B illustrate a motion flow of the handheld electronic device of FIG. 21.
Figure 22B:
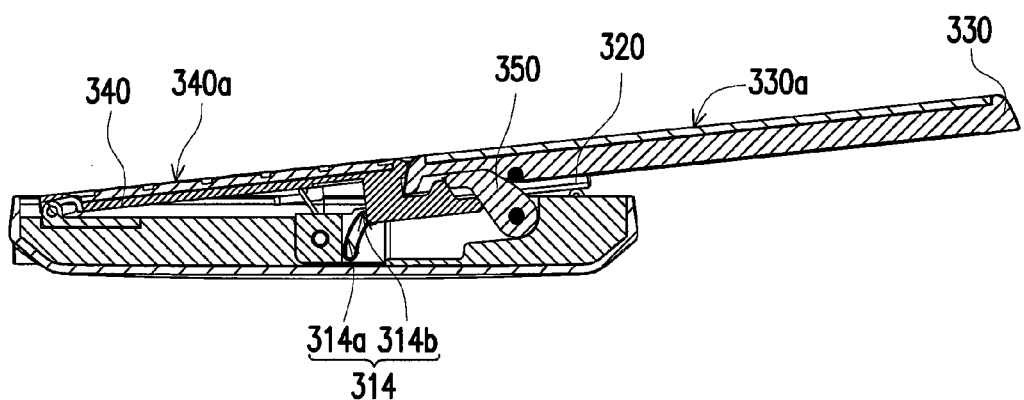

FIG. 21 is a cross-sectional view of the handheld electronic device of FIG. 18 along an E-E line. FIG. 22A and FIG. 22B illustrate a motion flow of the handheld electronic device of FIG. 21. Referring to FIG. 16, FIG. 19 and FIG. 21, the handheld electronic device 300 of the present embodiment includes at least one rotation member 350 (two rotation members are illustrated in FIG. 16) pivoted to the first body 310. The third body 310 has at least one extending portion 344 (two extending portions are illustrated in FIG. 16). When the handheld electronic device 300 is in the expanded state as that shown in FIG. 20B and FIG. 22B, the user can exert a force on the second body 330 to press the rotation members 350 to pivotally rotate relative to the first body 310, such that each of the rotation members 350 pushes the corresponding extending portion 344 to drive the convex pillar 342 to slide from the second section 314b to the first section 314a, and the handheld electronic device 300 is recovered back to the stacked state shown in FIG. 19. Moreover, when the handheld electronic device 300 is in the expanded state as that shown in FIG. 20B and FIG. 22B, the extending portions 344 are located at a bottom surface of the second body 330 to limit a tilting angle of the third body 340, such that the top surface 340a of the third body 340 and the top surface 330a of the second body 330 can smoothly form the continuous surface.

Figure 23:
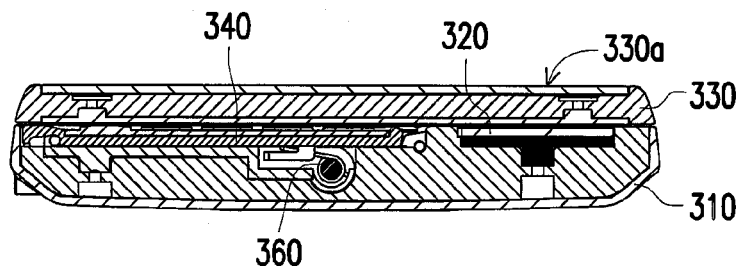
FIG. 23 is a cross-sectional view of the handheld electronic device of FIG. 18 along an F-F line.
Figure 24A:
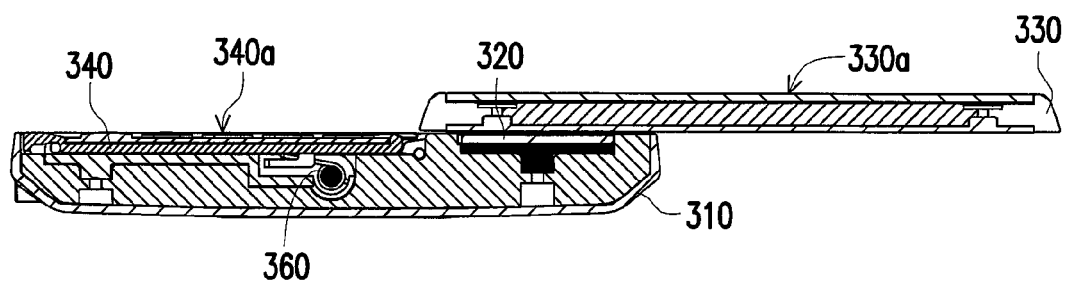
FIG. 24A and FIG. 24B illustrate a motion flow of the handheld electronic device of FIG. 23.
Figure 24B:
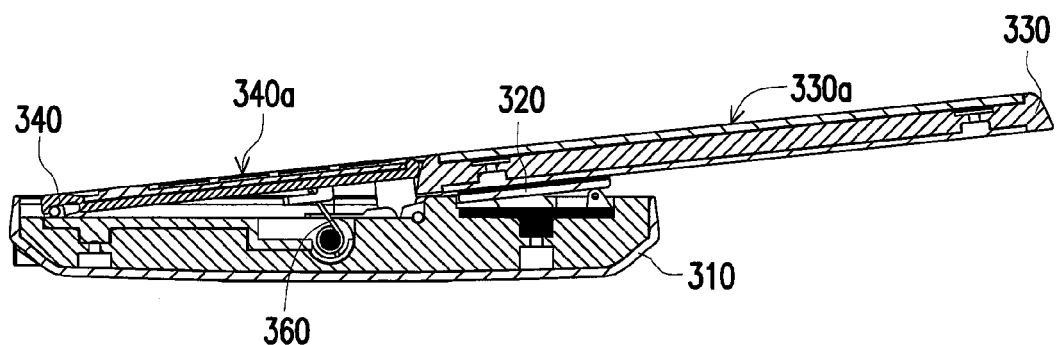

FIG. 23 is a cross-sectional view of the handheld electronic device of FIG. 18 along an F-F line. FIG. 24A and FIG. 24B illustrate a motion flow of the handheld electronic device of FIG. 23. Referring to FIG. 16 and FIG. 23, the handheld electronic device 300 of the present embodiment includes an elastic component 360. The elastic component 360 is, for example, a torsion spring and is connected between the first body 310 and the third body 340. When the handheld electronic device 300 is in the stacked state as that shown in FIG. 23, the structural interference between the second body 330 and the third body 340 forces the elastic component 360 to store elastic potential energy. When the third body 340 is exposed by the second body 330 as that shown in FIG. 24A, the structural interference between the second body 330 and the third body 340 is released and the elastic component 360 releases the elastic potential energy, and the third body 340 is pivotally rotated relative to the first body 310 to the state shown in FIG. 24B through an elastic force of the elastic component 360.

FIG. 25 is a cross-sectional view of the handheld electronic device of FIG. 18 along a G-G line. FIG. 26A and FIG. 26B illustrate a motion flow of the handheld electronic device of FIG. 25. Referring to FIG. 16 and FIG. 25, the handheld electronic device 300 of the present embodiment includes at least one push component 370 (two push components are illustrated in FIG. 16) and at least one elastic component 380 (two push components are illustrated in FIG. 16). Each of the push components 370 is pivoted to the first body 310. Each of the elastic components 380 is connected between the first body 310 and the corresponding push component 370. When the handheld electronic device 300 is in the stacked state as that shown in FIG. 15 and FIG. 25, the structural interference between the second body 330 and the third body 340 forces the elastic components 380 to store elastic potential energy. When the third body 340 is exposed by the second body 330 as that shown in FIG. 26A, the structural interference between the second body 330 and the third body 340 is released and the elastic components 380 release the elastic potential energy, and each of the push components 370 is pivotally rotated relative to the first body 310 through an elastic force of the corresponding elastic component 380, so as to push the pivot member 320 to pivotally rotate relative to the first body 310 to a state as that shown in FIG. 26B.

In summary, when the user slides the second body to expose the third body, the second body and the third body are pivotally rotated and tilted automatically, such that the top surface of the second body and the top surface of the third body commonly form the continuous surface. In this way, the handheld electronic device has an integral appearance in the expanded state, and the continuous surface provides the user a comfortable input interface, so as to increase the input speed. Moreover, since the second body and the third body are pivotally rotated automatically by only sliding the second body, the manual process for body motion is simplified, which avails the user quickly changing the handheld electronic device from the stacked state to the expanded state.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handheld electronic device, comprising:
   a first body;
   a pivot component, pivoted to the first body;
   a second body, slidably disposed on the pivot component; and
   a third body, pivoted to the first body and stacked between the first body and the second body, such that the handheld electronic device is in a stacked state, wherein when the second body slides along the pivot component to expose the third body, the pivot component is pivotally rotated relative to the first body automatically to drive the second body to tilt, the third body is pivotally rotated relative to the first body automatically to tilt, and a top surface of the second body and a top surface of the third body commonly form a continuous surface, such that the handheld electronic device is in an expanded state.

2. The handheld electronic device as claimed in claim 1, further comprising:
   an elastic component, connected between the first body and the pivot component, wherein when the handheld electronic device is in the stacked state, the elastic component stores elastic potential energy, and when the third body is exposed by the second body, the elastic component releases the elastic potential energy, and the pivot component is pivotally rotated relative to the first body through an elastic force of the elastic component.

3. The handheld electronic device as claimed in claim 1, further comprising:
   a push component, pivoted to the first body; and
   an elastic component, connected between the first body and the push component, wherein when the handheld electronic device is in the stacked state, the elastic component stores elastic potential energy, and when the third body is exposed by the second body, the elastic component releases the elastic potential energy, and the push component is pivotally rotated relative to the first body through an elastic force of the elastic component, so as to push the pivot component to pivotally rotate relative to the first body.

4. The handheld electronic device as claimed in claim 1, further comprising:
   a rod, having two ends respectively pivoted to the first body and the third body; and
   an elastic component, connected between the first body and the rod, wherein when the handheld electronic device is in the stacked state, the elastic component stores elastic potential energy, and when the third body is exposed by the second body, the elastic component releases the elastic potential energy, and the rod is pivotally rotated relative to the first body through an elastic force of the elastic component, so as to drive the third body to pivotally rotate relative to the first body.

5. The handheld electronic device as claimed in claim 4, wherein the rod has a convex portion, the pivot component has a concave portion, the convex portion is inserted into the concave portion, and when the rod is pivotally rotated relative to the first body through the elastic force of the elastic component, the convex portion pushes the pivot component to pivotally rotate relative to the first body.

6. The handheld electronic device as claimed in claim 1, wherein the third body has a hook, and when the handheld electronic device is in the expanded state, the hook leans against the second body to limit a tilting angle of the third body.

7. The handheld electronic device as claimed in claim 1, further comprising:
   a first rod, slidably disposed on the first body;
   a second rod, having two ends respectively pivoted to the first rod and the third body;
   a third rod, having two ends respectively pivoted to the first rod and the pivot component; and
   an elastic component, connected between the third body and the second rod, wherein when the handheld electronic device is in the stacked state, the elastic component stores elastic potential energy, and when the third body is exposed by the second body, the elastic component releases the elastic potential energy, and the first rod, the second rod and the third rod move in linkage through an elastic force of the elastic component, so as to drive the third body and the pivot component to pivotally rotate relative to the first body.

8. The handheld electronic device as claimed in claim 7, wherein when the handheld electronic device is in the expanded state, the second body is suitable of sustaining a force and resisting the elastic force of the elastic component to drive the pivot component, the first rod, the second rod, the third rod and the third body to move in linkage, such that the second body and the third body are parallel to the first body.

9. The handheld electronic device as claimed in claim 1, further comprising:
   an elastic component, connected between the first body and the third body, wherein when the handheld electronic device is in the stacked state, the elastic component stores elastic potential energy, and when the third body is exposed by the second body, the elastic component releases the elastic potential energy, and the third body is pivotally rotated relative to the first body through an elastic force of the elastic component.

10. The handheld electronic device as claimed in claim 1, wherein the first body has a sliding slot comprising a first section and a second section, the third body has a convex pillar, and the convex pillar is slidably disposed in the sliding slot and is suitable for sliding along the sliding slot as the third body is pivotally rotated relative to the first body, when the handheld electronic device is changed from the stacked state to the expanded state, the convex pillar is slid from the first section to the second section, and when the handheld electronic device is in the expanded state, an extending direction of the first section is tilted to the top surface of the third body, and an extending direction of the second section is parallel to the top surface of the third body.

11. The handheld electronic device as claimed in claim 10, further comprising:
   a rotation component, pivoted to the first body, wherein the third body has an extending portion, and when the handheld electronic device is in the expanded state, the second body is suitable of sustaining a force to press the rotation component to pivotally rotate relative to the first body, such that the rotation component pushes the extending portion to drive the convex pillar to slide from the second section to the first section.

12. The handheld electronic device as claimed in claim 11, wherein when the handheld electronic device is in the expanded state, the extending portion is located at a bottom surface of the second body to limit a tilting angle of the third body.

* * * * *